Figure 1:
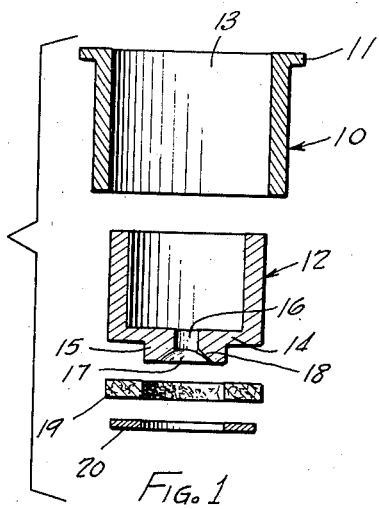

April 6, 1937.  W. CZARNECKI  2,076,227

VALVE

Filed March 23, 1936

Inventor
WALTER CZARNECKI
By Joshua R H Potts
Attorney

Patented Apr. 6, 1937

2,076,227

UNITED STATES PATENT OFFICE 2,076,227

VALVE

Walter Czarnecki, Eddington, Pa., assignor to Eddington Metal Specialty Co., Eddington, Pa., a corporation of Pennsylvania Application March 23, 1936, Serial No. 70,271

3 Claims. (Cl. 251—167)

This invention relates to valves of the sleeve and piston type, and is concerned primarily with the interrelation between the sleeve and the piston.

In the copending application of Walter Czarnecki, application Serial No. 31,312, filed July 15, 1935, and now Patent No. 2,041,906, granted May 26, 1936, for a "Valve", there is described and illustrated a pressure regulator valve which is commonly employed in oil burner installations, and these valves ordinarily include a sleeve and piston assembly, with the piston formed with a valve seat, which is movable to provide the necessary controlling effects.

Due to the fact that this piston is movable under the influence of pressure which is built up in the pressure chamber of the valve, it is important that an efficient seal between the piston and its sleeve be created and maintained during the service life of the valve. However, due to the fact that small particles of dirt and other foreign matter find their way in between these parts, continued relative movement therebetween has resulted in scoring, and a general deleterious effect on the seal, which should be maintained between these parts.

Accordingly, this invention has in view, as its foremost objective, the provision of a sleeve and piston assembly of the character above described, which includes means for preventing dirt and other foreign matter from becoming inserted between the engaging walls of the piston and sleeve.

In carrying out this idea in a practical embodiment, a gasket, of felt or other appropriate fibrous material, is positioned at the end of the piston which carries the valve seat, and this gasket is effective to keep foreign matter from finding its way between the walls of the piston and sleeve which engage each other.

Inasmuch as a valve seat is formed on one end of the piston, this invention has in view, as a more particular objective, the provision of an arrangement whereby the valve seat construction is also availed of as a means for maintaining the washer in assembled position on the piston. This end is attained by thickening the end wall of the piston about the valve seat to provide a cylindrical extension around which the gasket is positioned. A metallic washer is then forced over this cylindrical extension to provide a pressed fit which is effective to maintain the gasket and washer assembled on the head of the piston.

Other more detailed objects and advantages will in part become apparent and in part be hereinafter stated as the description of the invention proceeds.

The invention, therefore, comprises a sleeve and valve piston assembly in which a fibrous gasket is maintained assembled on the head of the piston by a washer which is forced about an extension on the head of the piston to provide a pressed fit.

Figure 2:
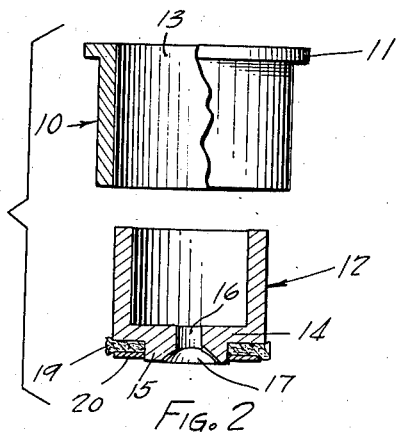
Figure 3:
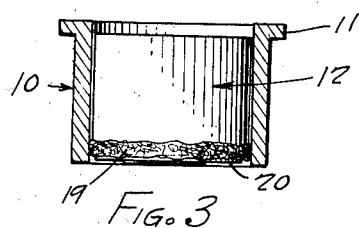

For a full and more complete understanding of the invention, reference may be had to the following description and accompanying drawing, wherein Figure 1 is a side view in section, showing the various elements of the sleeve and piston assembly in an exploded relationship, Figure 2 is another side view, partly in section and partly in elevation, bringing out the assembling of the gasket and washer on the piston, and Figure 3 is a side view showing the sleeve in section, and the piston and associated parts in elevation.

Referring now to the drawing, wherein like reference characters denote corresponding parts, a sleeve is shown at 10 as being of a cylindrical formation, the upper extremity of which is provided with a flange 11 that serves to maintain the sleeve in proper position due to the co-operation with other parts, not here illustrated, but clearly set forth in the co-pending application referred to above.

A piston of cylindrical formation is designated 12, and this piston 12 fits and slides in the bore of the sleeve 10, which bore is referred to as 13. The piston 12 is of a hollow construction and its lower end is closed by a head designated 14. Centrally of the piston 12 the material of the head 14 is thickened to provide a cylindrical extension 15 and this thickened portion 15 is formed with an opening 16 which terminates in a valve seat 17 that is frustro-spherical in formation. Ordinarily, this valve seat 17 is provided with a small groove 18 which constitutes a bleeder in a manner well-known in this art. The valve seat 17 cooperates with a valve member (not shown) in the manner clearly set forth in the said co-pending application.

A gasket is designated 19 and this gasket may be of felt or other suitable fibrous material. The gasket 19 fits about the cylindrical extension 15, and is maintained in assembled position by a metallic washer 20 that is forced over the cylindrical extension 15 by a pressed fit, this assembled relation being clearly developed in Figure 2.

When the parts are assembled, as shown in Figure 3, the gasket 19 serves to effectively guard against the entry of foreign matter between the bore 13 of the sleeve 10 and the exterior surface of the piston 12. After periods of continued usage, this gasket 19 may be replaced by first removing the washer 20 and substituting a new fibrous gasket.

While a preferred specific embodiment of the invention is herein set forth, it is to be clearly understood that I am not to be limited to the exact construction illustrated and described, because various modifications of these details may be provided in putting the invention into practice, within the purview of the appended claims.

I claim:

1. A sleeve and piston assembly of the character described, comprising a sleeve, a hollow piston having a head at one end slidable in the sleeve, said head being thickened centrally thereof to provide a cylindrical extension, the outer face of the thickened portion of the head being formed with a valve seat, a fibrous gasket disposed about said cylindrical extension, and means for maintaining the gasket assembled on the head of the piston.

2. A sleeve and piston assembly of the character described, comprising a sleeve, a hollow piston having a head at one end slidable in the sleeve, said head being thickened centrally thereof to provide a cylindrical extension, the outer face of the thickened portion of the head being formed with a valve seat, a fibrous gasket disposed about said cylindrical extension and a metallic washer forced about said cylindrical extension to provide a pressed fit which maintains the washer and gasket assembled on the head of the piston.

3. In a sleeve and piston assembly of the character described, a piston consisting of a hollow piston element formed with a head at one end, said head being thickened centrally thereof to provide a cylindrical extension, the outer face of said thickened portion being formed with a valve seat, a gasket on said head disposed about said extension, and a metallic washer on said extension and maintained in assembled position by a pressed fit.

WALTER CZARNECKI.